United States Patent Office 3,595,819
Patented July 27, 1971

3,595,819
HIGHLY TRANSPARENT SELF-EXTINGUISHING COMPOSITIONS OF METHACRYLATE AND VINYL CHLORIDE RESINS
Ibrahim Dakli and Tommaso Perotti Nigra, Busto Arsizio, and Rinaldo Casiraghi, Milan, Italy, assignors to Montecatini Edison S.p.A., Milan, Italy
No Drawing. Continuation-in-part of application Ser. No. 642,297, May 31, 1967, which is a continuation-in-part of application Ser. No. 354,791, Mar. 25, 1964, both now abandoned. This application July 24, 1968, Ser. No. 747,107
Int. Cl. C08f 29/22
U.S. Cl. 260—23                                6 Claims

ABSTRACT OF THE DISCLOSURE

Highly transparent, self-extinguishing, thermoplastic compositions having high resistance to chemical reagents and to atmospheric conditions and good resiliency, comprising (1) from about 35–55% by weight of a methacrylate resin containing less than about 0.08% by weight of bivalent sulfur, the resin being made up of a methyl methacrylate homopolymer and/or a copolymer of methyl methacrylate with an alkyl acrylate, the alkyl acrylate content of the copolymer being lower than 5% by weight; (2) from about 45–65% by weight of a vinyl chloride resin made up of a copolymer of vinyl chloride with from about 3% to 5% by weight of 2-ethylhexyl acrylate; (3) from about 0–10% by weight of a non-flammable, organic phosphoric acid salt plasticizer; and (4) lubricants and antioxidants.

CROSS-REFERENCE TO RELATED APPLICATION

This application is a continuation-in-part of copending application Ser. No. 642,297, filed May 31, 1967, now abandoned which is in turn a continuation-in-part of application Ser. No. 354,791, filed Mar. 25, 1964, now abandoned.

BACKGROUND OF THE INVENTION

(1) Field of the invention

This invention relates to highly transparent, self-extinguishing thermoplastic materials which are resistant to chemical reagents and to atmospheric conditions and have good resiliency.

(2) Description of the prior art

It is known that polymethyl methacrylate, which is transparent and substantially resistant to atmospheric conditions, is nevertheless unsatisfactory for many applications because it is highly flammable. Compositions comprising methacrylate resins and vinyl chloride resins are also known, but these do not solve the problem of obtaining manufactured articles which are self-extinguishing, resistant to atmospheric conditions, highly transparent and also have outstanding characteristics of resiliency, rigidity, hardness and heat resistance.

SUMMARY OF THE INVENTION

It has been found, quite unexpectedly, that when methyl methacrylate homopolymers or copolymers thereof with an alkyl acrylate are mixed in certain critical proportions with particular vinyl chloride/2-ethylhexyl acrylate copolymers, a homogeneous thermoplastic composition can be obtained which is highly transparent, highly resilient and resistant to weather or atmospheric conditions. In addition, such a thermoplastic mixture can be characterized as having self-extinguishing properties.

More particularly, the thermoplastic compositions of the present invention comprise (1) from about 35–55% by weight of a methacrylate resin containing less than about 0.08% by weight of bivalent sulfur, the resin being made up of a methyl methacrylate homopolymer and/or a copolymer of methyl methacrylate with an alkyl acrylate, the alkyl acrylate content of the copolymer being lower than 5% by weight; (2) from about 45–65% by weight of a vinyl chloride resin made up of a copolymer of vinyl chloride and 2-ethylhexyl acrylate, the 2-ethylhexyl acrylate content of the copolymer being from about 3% to 5% by weight; (3) from about 0–10% by weight of a non-flammable, organic phosphoric acid salt plasticizer; and (4) lubricants and antioxidants.

The self-extinguishing, highly transparent thermoplastic materials of this invention are resistant to various chemical compositions including the aliphatic hydrocarbons and have particularly outstanding mechanical characteristics. These thermoplastic materials can be worked, e.g., extruded, under conditions normally used in the plastic arts. Moreover, because of their outstanding resistance to attack by the elements, these materials can be used for many purposes, particularly for the preparation of corrugated or plane sheets, roofings, skylights, walls, panels and similar articles used in the building industry. Still another important use for the thermoplastic materials of this invention is in the manufacturing of self-extinguishing transparent pipes which are highly resistant to chemical reagents. Thus, because of their inherent characteristics, articles prepared from these plastics can be employed for various uses, and more particularly can be most desirably employed in those areas where non-flammable materials are required for safety purposes.

DESCRIPTION OF THE PREFERRED EMBODIMENTS

The term "transparent," as used herein, includes materials which when tested according to ASTM D1003 have been found to have a transparency value higher than 70%. Likewise, the term "self-extinguishing" is used to designate materials which are considered non-flammable when tested in accordance with ASTM D635.

The methacrylate resins suitable for use in the present invention include methyl methacrylate homopolymers and copolymers of methyl methacrylate with alkyl acrylates, wherein the alkyl group contains from 1 to 10 carbon atoms. A preferable alkyl acrylate for incorporation in the methacrylate resin is methyl acrylate. Such resins should contain no more than about 0.08% by weight of bivalent sulfur, e.g., in thio ethers or similar compounds, in order to avoid yellowing on the finished product and development of a bad smell during the working step.

A typical example of polymerization for preparing a methyl methacrylate/alkyl acrylate copolymer (95/5) presupposes to carry out the reaction in suspension, at a temperature comprised between 80° and 100° C. in the presence of 0.2% of butyl mercaptan. The copolymers of vinyl chloride which are used for preparing the thermoplastic compositions of this invention are the copolymers of vinyl chloride with 2-ethylhexyl acrylate. More particularly, it has been found that the 2-ethylhexyl acrylate monomer composition of the vinyl chloride copolymer must be from about 3% to 5% by weight for the most desirable combination of properties of resiliency, resistance to heat and workability in extrusion or injection molding.

Thus, it has been found that either the homopolymers or copolymers of methyl methacrylate can be mixed with copolymers of vinyl chloride so as to obtain a homogeneous thermoplastic composition which is highly transparent, resilient, resistant to atmospheric conditions and self-extinguishing.

More specifically, it has been found that, by mixing polymethyl methacrylate and/or a methyl methacrylate/alkyl acrylate copolymer with a vinyl chloride/2-ethylhexyl acrylate copolymer in certain critical proportions, it is possible to obtain a thermoplastic material in the form of sheets or other articles having outstanding characteristics which make the thermoplastic material practical for industrial and building uses. The polymers can be mixed together by various means, using standard equipment, including, for example, by mechanically mixing powders of the different polymers. Still further, it is possible to prepare a mixture of the polymers by utilizing solutions of polymers which the subsequently dried, leaving a homogeneous plastic composition. Of the various methods that may be used in preparing mixtures of the polymers, the use of polymeric powders is preferred. The polymeric compositions can be processed by any of the known methods used for plastics and are easily extruded without loss of any of their outstanding chemical or physical characteristics.

The compositions also include antioxidants in amounts between 0.001 and 1% by weight, such as 4,4'-thio-bis-6-tert-butyl-metacresol, 2,2'-methylene-bis-(4-methyl-6-tert-butylphenol), or 2,2'-methylene-bis-(4-ethyl-6-tert-butylphenol). Various lubricants which are known to be compatible with both of the resins, in amounts comprised between 0.001% and 2% by weight, including the higher fatty acids, e.g., stearic acid, esters of fatty acids (butyl palmitate, butyl stearate, stearates of polyglycols), paraffinic synthetic waxes, mineral oils, siliconic oils for facilitating extrusion are also included. Other known chemical components which can be added to the polymeric mixture include compounds which function as thermal stabilizers for polyvinyl chloride and include, for example, dibutyl tin maleate, or organic salts, e.g., stearate and/or laurates, of barium and zinc, barium and cadmium, or barium, zinc and cadmium. In addition, hydroxyphenyl benzotriazole, 2-hydroxy-4-methoxybenzophenone, 2,4-dihydroxy-benzophenone, or 2-hydroxy-4-octanoxy-benzophenone may be added to the polymeric composition as ultraviolet adsorbers. If desired, small amounts of a blueing compound including, for example, one of the anthraquinone derivatives, e.g., 1-para-tolyl-amino-4-hydroxy-anthraquinone, which is sold under the trade names Calco Oil Violet ZIRS (American Cyanamid Co.) and Alizarin Violet 3B BASE (Montecatini Edison S.p.A.), can be added with the other ingredients to the polymeric mixture.

The addition of these stabilizing agents, etc., is made primarily for the purpose of maintaining the desirable characteristics of the composition during the processes normally employed in preparing the various articles, e.g., machining, etc.

The mixing may optionally be aided by addition of variable amounts, preferably not higher than 10% by weight of the composition, of other resins such as styrene/acrylonitrile or alpha-methylstyrene/acrylonitrile copolymers in order to increase the compatibility of the vinyl chloride copolymer with the polymethylmethacrylate or its copolymer. The polymeric composition can be dyed, if desired, by using dyestuffs and/or pigments normally used for coloring plastic compositions. In addition, various inert fillers can be added to the polymeric composition in various amounts depending upon the ultimate use of the final product.

To further improve the polymeric composition, it is often desirable to add up to about 10% by weight of the total composition of a plasticizer which improves the workability of the composition. It is particularly important that if a plasticizer be employed, it should be non-flammable in order to insure the non-flammability of the final products. Suitable plasticizers include the organic salts of phosphoric acid, e.g., trichloroethyl phosphate, tricresyl phosphate, triphenyl phosphate, etc.

It has been discovered that in order to obtain a product which is transparent, self-extinguishing and at the same time substantially resistant to weather or atmospheric conditions, it is necessary to use each of the polymers and/or copolymers in certain critical ratios. Thus, it was discovered, contrary to what might be expected, that by increasing the amount of transparent material, i.e., methyl methacrylate resin, to an amount substantially in excess of 55% by weight, the transparency of the final product decreased. Moreover, if the transparent methyl methacrylate resin was used in an amount substantially below 35% by weight, the transparency of the polymeric composition also decreased. Consequently, it was found that there was only a narrow range at which the mixture comprising methyl methacrylate resin and vinyl chloride resin was transparent.

Similar results were discovered in determining the resistance of the compositions to atmosphere or weather conditions. In tests carried out on samples exposed to sunlight, it was found that increasing the amount of vinyl chloride resin caused a decrease in the resistance to atmospheric conditions. Compositions having vinyl chloride resin present in an amount substantially in excess of 65% by weight were found to be unsatisfactory. Likewise, it was discovered that products which contained increasing amounts of methyl methacrylate resin had a decreasing flame resistance. Accordingly, in order to obtain the outstanding characteristics, for purposes of this invention, it has been found necessary to use mixtures of the two resins in amounts ranging from about 35–55% by weight of methacrylate resin with, correspondingly, about 45–65% by weight of vinylchloride resin.

Moreover, we have found that by selecting as the vinyl chloride resin one which consists of 95–97 parts by weight of vinyl chloride and 3–5 parts by weight of 2-ethylhexyl acrylate, surprisingly superior balanced properties, including both high resiliency and Vicat degree, are achieved.

The polymethyl methacrylate or methacrylate copolymer and the vinyl chloride copolymer for use in the present invention are preferably prepared according to polymerization methods which result in transparent polymers, e.g., suspension polymerization. Bivalent sulfur should be present to an extent no more than about 0.08% by weight. The intrinsic viscosity of the polymethyl methacrylate or its copolymers may vary from about 0.27 to 0.6, wherein intrinsic viscosity $[\eta]$ is defined as follows:

$$[\eta] = \lim_{C \to 0} \left[ \frac{\ln (\text{relative viscosity})}{C} \right]$$

wherein the relative viscosity is the ratio between the viscosity of the solution containing the polymer and the viscosity of the solvent and C is the concentration of the polymer in the solvent expressed in g./100 cc. of solvent. The solvent used in determining the viscosity is benzene. The vinyl chloride copolymers which may be used for purposes of this invention have K values (constant) ranging from 48 to 82 as determined from a 0.5% solution in cyclohexanone at 25° C. The K values are derivable from the formula of Fikentscher:

$$\log \eta r = \left( K + \frac{75 K_2}{1 + 1.5 KC} \right) C$$

wherein:

K is the value in question
C is the concentration of the polymer in the solvent
$\eta r$ is the relative viscosity The following examples are presented to further illustrate the polymeric compositions of this invention without limiting the scope thereof.

EXAMPLES 1–6

The composition of the polymeric materials of each of Examples 1–6 are set forth in Table I, the relative proportions of each of the ingredients being by weight.

Table I

| Component: | Parts by weight |
|---|---|
| Polymethyl methacrylate [$\eta$]=0.35–0.37 | 50 |
| Vinyl chloride/2-ethylhexyl acrylate copolymer (See Table II for monomer ratios). (K=64–68) | 50 |
| Thermal stabilizer (dibutyl tin maleate) | 1.5 |
| Lubricant (stearic acid) | 1.0 |
| Ultraviolet absorber (hydroxyphenylbenzotriazole) | 0.2 |
| Antioxidant (4,4′ - thio-bis-6-tert-butyl-metacresol) | 0.015 |
| Anthraquinone blueing agent (Calco Oil Violet ZIRS) | 0.0003 |

The compositions were prepared by mixing the ingredients in the following manner. The thermal stabilizer, i.e., dibutyl tin maleate, was dispersed in a powder of the vinyl chloride resin in a powder mixer, until the granules were entirely eliminated. In a separate mixer, the polymethyl methacrylate was homogenized with the remaining ingredients of Table I.

The two mixtures, prepared separately, were then homogenized in a Banbury type mixer. Alternatively, a cylinder mixer or in a screw extruder could be used. The polymeric composition thus obtained was easily extruded. However, the composition can be used in the form of granules which can be injected or pressure molded.

Table II reports the characteristics of the polymer compositions obtained using vinyl chloride/2-ethylhexyl acrylate copolymers of varying monomer ratios.

TABLE II

| Composition (Example Number) | Ratio vinyl chloride/ 2-ethylhexyl acrylate in the copolymer | Izod resilience at 23° C. ASTM D 256, kg./cm./cm. | Vicat degree (° C.) (heat resistance) ASTM D 1525, ° C. | Rockwell hardness ASTM D 785-51, M |
|---|---|---|---|---|
| 1 | [1] 100/0 | 2.8 | 87 | 82 |
| 2 | 98/2 | 3.5 | 88 | 84 |
| 3 | 97/3 | 4.0 | 85 | 83 |
| 4 | 96/4 | 4.0 | 85 | 83 |
| 5 | 95/5 | 4.1 | 85 | 83 |
| 6 | 94/6 | 4.5 | 79 | 81 |

[1] Employed polyvinylchloride homopolymer for comparison.

From Table II it is evident that within the range of vinyl chloride/2-ethylhexyl acrylate ratios from 95/5 to 97/3 the compositions possess very good characteristics of both resilience and Vicat degree. On the other hand, outside of this range of monomer ratios either Vicat degree or Izod resilience of the final composition are at undesirably low values. Thus, it is preferred that the vinyl chloride resin contain from about 3% to 5% by weight of alkyl acrylate comonomer.

EXAMPLES 7 AND 8

The compositions of Examples 7 and 8 were the same as those of Examples 1 and 4, respectively, except that in each instance a methyl methacrylate/methyl acrylate copolymer (weight ratio=95/5) ([$\eta$]=0.35–0.37) was substituted for the polymethyl methacrylate of the former examples.

Table III presents the results of tests of the properties of the products of Examples 1, 4, 7 and 8 as well as the properties of the individual polymers, for comparison.

Table IV reports the results of additional tests for heat resistance of the compositions of Examples 1 and 7 and of the individual polymers.

TABLE III

| Composition | Tensile strength (kg./cm.$^2$) ASTM D 638-58T | Elongation at break (percent) ASTM D 638-58T | Resistance to bending stress (kg./cm.$^2$) ASTM D 790-58T | Tensile elasticity modulus (kg./cm.$^2$) ASTM D 790-58T | Izod resilience at 23° C. (kg./cm.$^2$) ASTM D 256 | Rockwell hardness (M) ASTM D 785-51 |
|---|---|---|---|---|---|---|
| Example Number: | | | | | | |
| 1 | 690 | 3.2 | 1,200 | 32,500 | 2.8 | 82 |
| 4 | 700 | 4.0 | 1,200 | 32,000 | 4.0 | 83 |
| 7 | 720 | 3.8–4.0 | 1,030 | 33,300 | 2.8–3.0 | 80–81 |
| 8 | 700 | 4.0 | 1,100 | 32,000 | 4.5 | 81 |
| Polymers: | | | | | | |
| Polyvinyl chloride K=62–64 | 570–600 | 3.0–3.3 | 900–950 | 33,000–35,000 | 4.0–4.5 | 53–55 |
| Polymethyl methacrylate [$\eta$]=0.44 | 770 | 2–3 | 1,260 | 32,000–33,000 | 1.8 | 96 |
| Methyl methacrylate/methyl acrylate copolymer (95/5) [$\eta$]=0.35–0.37 | 730–740 | 2–3 | 1,230 | 29,000–31,000 | 1.0–1.5 | 88–90 |

TABLE IV

| Combustion | Vicat degree (heat resistance) (° C.) ASTM D 1525 | Heat distortion (° C.) ASTM D 648-56 | Flow test A (° C.) ASTM D 569-48 | Resistance toward combustion |
|---|---|---|---|---|
| Example Number: | | | | |
| 1 | 87 | 77 | 152 | Nonflammable. |
| 7 | 86–87 | 75–77 | 147–148 | Do. |
| Polymer: | | | | |
| Polyvinyl chloride K=62–64 | 86–87 | 75–77 | 155–158 | Do. |
| Polymethyl methacrylate [$\eta$]=0.44 | 110 | 90 | 162 | Flammable. |
| Methyl methacrylate/methyl acrylate copolymer (95/5) [$\eta$]=0.35–0.37 | 97–100 | 78–80 | 145–146 | Do. |

EXAMPLE 9

The composition of the polymeric material is set forth in Table V, the relative proportions of each of the ingredients being by weight.

Table V

| Component: | Parts by weight |
|---|---|
| Polymethylmethacrylate ($[\eta]=0.43$–0.45) | 30 |
| Vinyl chloride/2-ethylhexyl acrylate copolymer (ratio by weight 96/4) K=64–68 | 60 |
| Styrene/acrylonitrile copolymer | 10 |
| Thermal stabilizer (dibutyl tin maleate) | 1.8 |
| Lubricant (stearic acid) | 1.0 |
| Ultraviolet adsorber, hydroxy phenyl benzotriazole | 0.2 |
| Antioxidant (4,4-thio-bis/6 tert. butyl metacresol) | 0.015 |
| Anthraquinone blueing agent (Calco Oil Violet ZIRS) | 0.0003 |

The composition was prepared by mixing the ingredients in the following manner: the thermal stabilizer, e.g. dibutyl tin maleate, was dispersed in a powder of the vinyl chloride/2-ethylhexyl acrylate, until the granules were entirely eliminated.

In a separate mixer polymethylmethacrylate was homogenized with the other ingredients indicated in Table V.

The two mixtures, prepared separately, were then homogenized in a Banbury type mixer or in a cylinder mixer or in a screw extruder. The polymeric composition thus obtained was easily extruded. However, the composition can be used in the form of granules which can be injected or pressure molded. Table VI reports the characteristics of the composition.

TABLE VI
(For composition see Table V)

| Characteristics | ASTM | Measure unit | Results |
|---|---|---|---|
| Tensile strength | D 638–58T | Kg./cm.$^2$ | 570 |
| Elongation at break | D 638–58T | Percent | 2 |
| Resistance to bending stress | D 790–58T | Kg./cm.$^2$ | 900 |
| Tensile elasticity modulus | D 790–58T | Kg./cm.$^2$ | 34,500 |
| Izod resilience at 23° C | D 256 | Kg./cm./cm. | 4.0 |
| Rockwell hardness | D 785–51 | M | 83 |
| Vicat degree | D 1525 | °C | 84 |
| Heat distorsion | D 648–56 | °C | 78 |
| Flow test A | D 569–48 | °C | 147 |
| Resistance toward combustion | D 635 | | (1) |

[1] Nonflammable.

EXAMPLE 10

The transparency of sheets comprising varying amounts of polyvinyl chloride and polymethyl methacrylate was studied. The formulations contained varying ratios of the polymers, having the overall composition of Table VII.

Table VII

| Component: | Parts by weight |
|---|---|
| Vinyl chloride/2-ethylhexyl acrylate copolymer (ratio by weight=96/4; K=64–68) | 100 |
| Thermal stabilizer (dibutyl tin maleate) (3% by weight of PVC). | |
| Lubricant (stearic acid) | 1.0 |
| U.V. absorber (hydroxyphenylbenzotriazole) | 0.2 |
| Antioxidant (4,4' - thiobis-6-tert-butyl-metacresol) | 0.015 |
| Anthaquinone derivative blueing agent (Calco Oil Violet ZIRS) | 0.0003 |

As indicated by the transparency results reported in Table VIII, when there was a preponderance of polymethyl methacrylate in the composition, generally the more of the transparent material, i.e., polymethyl methacrylate, added to the mixture, the less transparent the mixture became. Thus, it was found that the amount of polymethyl methacrylate used must be in the range of from about 35–55% by weight of the composition to obtain maximum transparency.

TABLE VIII

| Characteristics [1] | ASTM test method | Units | Ratio of vinyl chloride copolymer to polymethyl methacrylate | | | | | | | | |
| | | | 0/100 | 20/80 | 30/70 | 40/60 | 50/50 | 60/40 | 70/30 | 80/20 | 100/0 |
|---|---|---|---|---|---|---|---|---|---|---|---|
| Transparency | D1003 Ill. "C" | Percent | 91 | 35 | 42 | 75 | 82 | 78 | 75 | 73 | 63 |
| Diffusion | D1003 Ill. "C" | do | >2 | 66 | 64 | 10 | 7 | 21 | 19 | 14 | |

[1] The tests were carried out on samples 3 mm. thick.

EXAMPLE 11

This example is presented for comparative purposes to illustrate the criticality of the weight ranges of the methacrylate resin, vinyl chloride resin, and non-flammable plasticizer for obtaining compositions having the combined characteristics of being self-extinguishing, highly transparent, and resistant to chemical reagents and atmospheric conditions, as well as having high rigidity, hardness and resistance to bending stresses. The compositions set forth in Table IX are typical compositions in accordance with prior art disclosures. Comparison of the characteristics set forth in Table X with those of compositions within the scope of the present invention set forth in the previous examples illustrates the criticality of the present invention in obtaining the desired combination of properties.

TABLE IX

| Components | Composition 1 (British Patent 584,015) | Composition 2 (British Patent 584,015) | Composition 3 (U.S. Patent 2,407,668) |
|---|---|---|---|
| Polymethyl methacrylate, percent | 50 | 50 | 13.9 |
| Vinyl chloride copolymer | 20 | 20 | 41.6 |
| Tricresyl phosphate | 30 | | 27.8 |
| Dibutyl phthalate | | 30 | |
| Zinc carbonate | | | 16.7 |

TABLE X

| Characteristics | ASTM test | Units of measure | Composition | | |
| | | | 1 | 2 | 3 |
|---|---|---|---|---|---|
| Appearance | | | Opaque | Opaque | Opaque. |
| Resistance to bending stress | D 790–58T | Kg./cm.$^2$ | About 125 | About 15 | About 150. |
| Tensile elasticity modulus | D 790–58T | Kg./cm.$^2$ | About 4,500 | About 450 | About 5,000. |
| Rockwell hardness | D 785–51 | M | N.d.$^2$ | N.d. | N.d. |
| Vicat degree [1] | D 1525 | °C | N.d.$^3$ | N.d. | N.d. |
| Heat distortion | D 648–56 | °C | N.d. | N.d. | N.d. |
| Resistance toward combustion | D 635 | | Non-flammable | Flammable | Non-flammable. |

[1] Determined with a weight of 5 kg. as in Table II.
[2] N.d. means not determinable due to the softness of the materials.
[3] When operating with a weight of 1 kg., the Vicat degree is 46° C.

Variations and modifications can, of course, be made without departing from the spirit and scope of the invention.

Having thus described our invention, what we desire to secure by Letters Patent and hereby claim is:

1. A highly transparent thermoplastic composition having good resiliency comprising
    (a) from about 35% to 55% by weight of a methacrylate resin containing less than about 0.08% bivalent sulfur, said resin consisting essentially of a homopolymer of methyl methacrylate or a copolymer of methyl methacrylate with no more than about 5% by weight of said copolymer of a lower alkyl acrylate;
    (b) from about 45% to 65% by weight of a vinyl chloride resin, said resin consisting essentially of a copolymer of vinyl chloride with from about 3% to about 5% of 2-ethylhexyl acrylate;
    (c) a lubricant selected from the group consisting of fatty acids, and esters of fatty acids, in an amount between 0.001% and 2% by weight relative to the total weight of the composition;
    (d) an antioxidant selected from the group consisting of 4,4'-thio-bis-6-tert-butyl-meta-cresol; 2,2'-methylene-bis-(4-methyl-6-tert-butylphenol); and 2,2'-methylenebis(4-ethyl-6-tert-butylphenol) in an amount between 0.001% and 1% by weight relative to the total weight of the composition.

2. The composition of claim 1 wherein said lower alkyl acrylate is methyl acrylate.

3. The composition of claim 1 wherein said lubricant is selected from the group consisting of stearic acid, butyl palmitate and butyl stearate.

4. The composition of claim 1, further comprising a copolymer of styrene or alphamethylstyrene and acrylonitrile, said copolymer being present in an amount up to about 10%, based on the combined weight of the methacrylate resin and the vinyl chloride resin.

5. The composition of claim 1 which further comprises up to about 10% of a non-flammable plasticizer, said plasticizer being an organic phosphoric acid salt.

6. The composition of claim 5 wherein said organic phosphoric acid salt is a member selected from the group consisting of trichloroethyl phosphate, tricresyl phosphate, and triphenyl phosphate.

References Cited

FOREIGN PATENTS 615,345    2/1961    Canada.
1,033,464    6/1966    Great Britain.

DONALD E. CZAJA, Primary Examiner

D. J. BARRACK, Assistant Examiner

U.S. Cl. X.R.

260—28.5, 30.6, 31.2, 33.6, 45.95, 86.3, 898, 899, 901